US005526978A

United States Patent [19]
Nagatsuka et al.

[11] Patent Number: 5,526,978
[45] Date of Patent: Jun. 18, 1996

[54] METHOD FOR SOLDERING ELECTRONIC COMPONENTS

[75] Inventors: Toshiyuki Nagatsuka, Ichikawa; Yumiko Iijima, Chiba; Hiroyuki Ohira, Matsudo, all of Japan

[73] Assignee: TDK Corporation, Japan

[21] Appl. No.: 223,583

[22] Filed: Apr. 6, 1994

[30]  Foreign Application Priority Data

Nov. 24, 1992 [JP] Japan .................... 4-336735

[51] Int. Cl.$^6$ .................... B23K 31/02
[52] U.S. Cl. .................... 228/219
[58] Field of Search .................... 228/219, 180.21, 228/218, 232, 42; 219/390

[56]  References Cited

U.S. PATENT DOCUMENTS

| | | | |
|---|---|---|---|
| 4,580,716 | 4/1986 | Barresi et al. | 228/219 |
| 5,163,599 | 11/1992 | Mishina et al. | 228/42 |
| 5,180,096 | 1/1993 | Kondo | 228/180.1 |
| 5,232,145 | 8/1993 | Alley et al. | 228/102 |
| 5,242,096 | 9/1993 | Tsunabuchi et al. | 228/9 |
| 5,259,546 | 11/1993 | Volk | 228/102 |

FOREIGN PATENT DOCUMENTS

| | | |
|---|---|---|
| 0351460 | 1/1990 | European Pat. Off. . |
| 0363136 | 4/1990 | European Pat. Off. . |
| 0486390 | 5/1992 | European Pat. Off. . |
| 9215553 | 11/1992 | Germany . |
| 4302976 | 2/1993 | Germany . |
| 1215462 | 8/1989 | Japan . |
| 1305594 | 12/1989 | Japan . |
| 2000396 | 1/1990 | Japan . |
| 3218093 | 9/1991 | Japan . |
| 3268864 | 11/1991 | Japan . |
| 4200991 | 7/1992 | Japan . |
| 515970 | 1/1993 | Japan . |
| 587987 | 11/1993 | Japan . |
| 1330881 | 9/1973 | United Kingdom . |
| 1402174 | 8/1975 | United Kingdom . |

OTHER PUBLICATIONS

Loten mit "Profil." In: productronic, 1989. Nr. 4, S.26,28, Die Fachzeit–schrift fur Elektronik–Fertigung und Test.
Hwang, De. Jennie, *Soldering with Controlled Atmospheres*, Circuits Manufacturing, May 1990, pp. 64–65.
Arslancan, Ahmet N., *IR Solder Reflow in Controlled Atmosphere of Air and Nitrogen*, SMTCON Technical Proceedings, Apr. 1990 pp. 301–308.

*Primary Examiner*—Richard K. Seidel
*Assistant Examiner*—Jeanne M. Elpel
*Attorney, Agent, or Firm*—Lerner, David, Littenberg, Krumhutz & Mentlik

[57]  ABSTRACT

A method for soldering an electronic component capable of accomplishing satisfactory soldering of an electronic component using paste solder even in an oven constructed into a non-closed structure which causes flowing of an ambient atmosphere. Dehumidified air is introduced through a dehumidified air inlet section into the oven to keep a dehumidified atmosphere in the oven, to thereby prevented activity of flux contained in the paste flux from being deteriorated.

9 Claims, 1 Drawing Sheet

5,526,978

METHOD FOR SOLDERING ELECTRONIC COMPONENTS

BACKGROUND OF THE INVENTION

This invention relates to a method for soldering an electronic component and an apparatus therefor, and more particularly to an electronic component soldering method and an apparatus therefor wherein preheat and reflow are carried out in turn with time in an oven of a non-closed structure which causes flowing of an ambient atmosphere thereinto, resulting in an electronic component being mounted on a printed board by soldering using paste solder.

A nitrogen gas reflow soldering apparatus was developed for the purpose of elimination of cleaning after soldering of an electronic component using paste solder. The reflow soldering apparatus conventionally known in the art is adapted to carry out soldering in a non-oxidizing atmosphere in an oven charged with nitrogen gas to prevent oxidization of solder alloy and soldered lands, to thereby eliminate use of Freon (trademark), trichloroethylene or the like in the subsequent cleaning operation.

To this end, the conventional reflow soldering apparatus includes an oven body which is constructed into a closed structure so as to keep an oxygen concentration of an atmosphere in the oven body at a level as low as 10 to 100 ppm to minimize consumption of nitrogen. More particularly, the oven body is divided into an inlet nitrogen gas purge chamber section, a preheat and reflow section and an outlet nitrogen gas purge chamber section, wherein the inlet and outlet sections each are provided with a two-stage shutter to isolate a soldering zone in the oven body from an ambient atmosphere. Also, in order to minimize outflow of nitrogen gas from the oven body, a bearing section for a revolving shaft of each of fans arranged in the oven body and each of the shafts are constructed into a closed structure and a conveyor or carrier system is constructed so as to automatically control, in synchronism with operation of the shutters, a speed at which a printed board is fed to the inlet nitrogen gas purge chamber section and discharged from the outlet nitrogen gas purge chamber section.

Although the conventional reflow soldering apparatus constructed as described above ensures satisfactory soldering of an electronic component, it causes an increase in cost of equipment because it is required to construct the oven body into a closed structure. Also, it requires not only a large amount of nitrogen gas but troublesome replacement of a nitrogen gas cylinder when the cylinder is installed as a nitrogen gas source. Further, the reflow soldering apparatus, when a nitrogen gas producing unit is provided in association with the apparatus, causes a further increase in cost of equipment. Nevertheless, when the oven body is constructed into a non-closed structure, the conventional reflow soldering apparatus fails to prevent occurrence of solder holes and formation of an oxide film on solder alloy due to soldering because it does not prevent flow of an ambient atmosphere into the oven body.

SUMMARY OF THE INVENTION

The present invention has been made in view of the foregoing disadvantage of the prior art while taking notice of the fact that as a result of careful study on an effect of an ambient atmosphere on solder alloy and flux contained in paste solder, it was found that moisture contained in the ambient atmosphere adversely affects activity of the flux and the like. Thus, the present invention excludes a concept of replacing oxygen in an oven body of a closed structure with nitrogen gas.

Accordingly, it is an object of the present invention to provide a method for soldering an electronic component which is capable of accomplishing satisfactory soldering even in an oven of a non-closed structure which allows flowing of an ambient atmosphere thereinto.

It is another object of the present invention to provide an apparatus for soldering an electronic component which is capable of permitting satisfactory soldering to be carried out even in an oven of a non-closed structure which allows flowing of an ambient atmosphere thereinto.

In accordance with one aspect of the present invention, a method for soldering an electronic component is provided. The method comprises the steps of subjecting paste solder to a preheat treatment and a reflow treatment in turn with time in an oven constructed into a non-closed structure which allows flowing of an ambient atmosphere into the oven body, resulting in fixing the electronic component on a printed board by soldering using the paste solder and introducing dehumidified air into the oven to provide an interior of the oven with a dehumidified atmosphere.

In general, flux contained in solder used for soldering of an electronic component is deteriorated in activity due to absorption of moisture or water by an activator, a resin material and the like contained in the flux. In the present invention, dehumidified air is introduced into the oven to provide an interior of the oven with a humidified atmosphere, to thereby prevent activity of flux of the paste solder from being deteriorated, resulting in the flux forming a satisfactory protective film on solder alloy of the paste solder.

In a preferred embodiment of the present invention, the dehumidified air comprises nitrogen-mixed air formed by mixing a dehumidified ambient atmosphere and nitrogen gas with each other. Nitrogen gas contained in the nitrogen-mixed air substantially prevents oxidation of lands of a conductive pattern and solder alloy, to thereby ensure satisfactory soldering of the electronic component.

In a preferred embodiment of the present invention, the preheat treatment and reflow treatment are carried out in chambers defined in the oven in a manner to be separated from each other, respectively. Such construction permits the dehumidified air to be efficiently introduced into any desired section in the oven and keeps temperature profile conditions extending from preheat to reflow satisfactory, to thereby carry out heating of the paste solder.

In accordance with another aspect of the present invention, an apparatus for soldering an electronic component is provided. The apparatus includes an oven constructed into a non-closed structure which allows flowing of an ambient atmosphere into the oven. The oven has a preheat means and a reflow means defined therein, in which a heat treatment is carried out to fix the electronic component onto a printed board by soldering using paste solder. The apparatus also includes a dehumidified air inlet section provided on the oven for introducing dehumidified air into the oven. Thus, the apparatus of the present invention restrains an increase in cost of equipment.

In a preferred embodiment of the present invention, the dehumidified air inlet section comprises a nitrogen-mixed air inlet section. The nitrogen-mixed air inlet section comprises a dehumidified ambient atmosphere feed passage for a dehumidified ambient atmosphere, a nitrogen gas feed passage for nitrogen gas, and an agitator for connecting the dehumidified ambient atmosphere feed passage and nitrogen gas feed passage to each other. Thus, the dehumidified nitrogen-mixed air may be efficiently introduced into any desired position in the oven.

In a preferred embodiment of the present invention, the preheat means and reflow means are separated from each other by a partition means arranged in the oven.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, the present invention will be described hereinafter with reference to the accompanying drawings.

Figure 1:
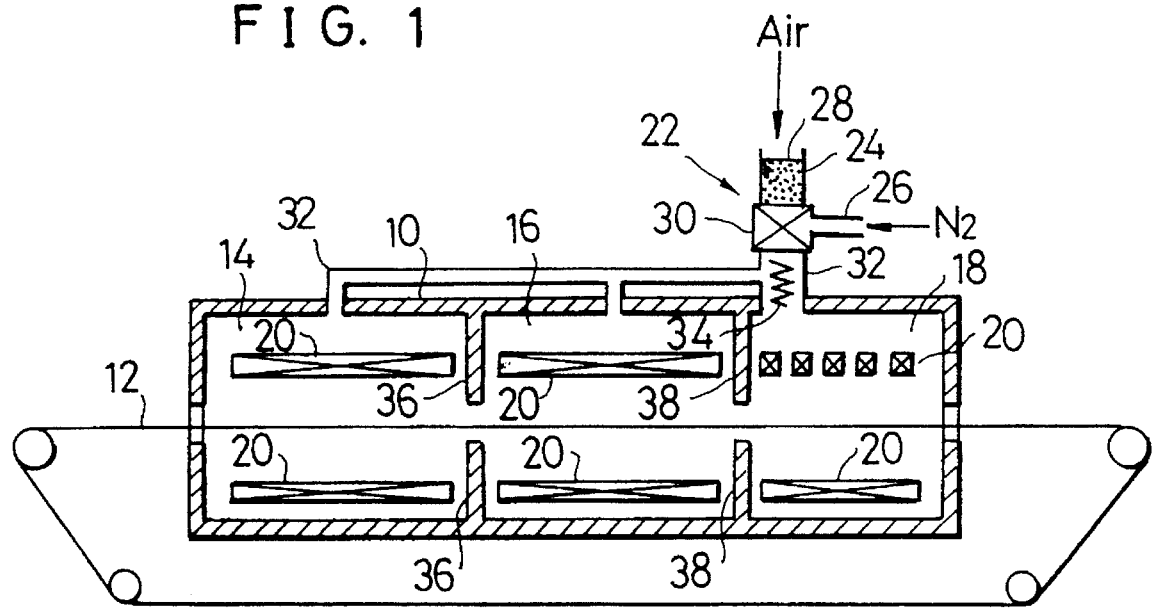
FIG. 1 is a schematic sectional view showing an apparatus for soldering an electronic component according to the present invention.

Referring first to FIG. 1, a reflow oven is illustrated which is applied to surface-mount an electronic component on a printed board according to an electronic component soldering method of the present invention. The reflow oven is fed with a printed board on which an electronic component is previously temporarily held by applying paste solder to lands of a conductive pattern on the printed board and positioning each of external electrodes of the component between predetermined ones of the solder-applied lands while keeping contact therebetween.

The reflow oven, as shown in FIG. 1, includes an oven body 10 which is constructed into a non-closed structure which allows flowing of an ambient atmosphere thereinto. More particularly, the oven body 10 is so constructed that inlet and outlet sections thereof through which introduction and discharge of a printed board with respect to the oven body 10 are carried out are open to permit an air balance to be kept in the oven body 10 due to access of an ambient atmosphere through the inlet and outlet sections to the oven body 10. The oven body 10 is provided therein with a conveyor 12 such as a chain conveyor or the like which acts to convey the printed board throughout a soldering zone defined in the oven body 10 while carrying it thereon. An interior of the oven body 10 is divided into a first-stage preheat section 14, a second-stage preheat section 16 and a reflow section 18. The sections 14, 16 and 18 of the oven body 10 each are provided therein with a pair of heaters 20 in a manner to be vertically opposite to each other. A temperature obtained by the heaters 20 in each of the sections is determined depending on a composition of paste solder used. For example, the heaters 20 are so arranged that a temperature in the first-stage preheat sections 14 is set to be about 150° C. and that in the second-stage preheat section 16 is set to be about 170° to 175° C., and the reflow section 18 is set at a temperature of about 183° C. In the illustrated embodiment, only two preheat sections or the first-stage preheat section 14 and second-stage preheat section 16 are arranged. Alternatively, three or more such preheat sections may be suitably arranged as required.

The reflow oven basically constructed as described above is also provided on an upper side thereof with a dehumidified air inlet section 22 for introducing dehumidified air into the oven body 10. In the illustrated embodiment, the dehumidified air inlet section 22 comprises a nitrogen-mixed air inlet section for introducing nitrogen-mixed air formed by mixing a dehumidified ambient atmosphere and nitrogen gas with each other. However, it should be understood that in the present invention, it is not necessarily required to specially add nitrogen to an ambient atmosphere, therefore, the dehumidified air may comprise only a dehumidified ambient atmosphere. In the illustrated embodiment, the nitrogen-mixed air inlet section 22 includes an ambient atmosphere feed passage 24 connected to an ambient atmosphere feed means such as an air blower or the like and a nitrogen gas feed passage 26 connected to a nitrogen gas source such as a nitrogen gas cylinder. The ambient atmosphere feed passage 24 is charged with a dehumidifying agent acting as a dehumidification means 28. Thus, the passage 24 serves as a dehumidified ambient atmosphere feed passage. Then, the ambient atmosphere feed passage 24 and nitrogen gas feed passage 26 are commonly connected through a mixer or agitator 30 to a series of nitrogen-mixed air feed passages 32 for nitrogen-mixed air which are arranged in a manner to be ramified. The agitator 30 functions to mix the dehumidified ambient atmosphere and nitrogen gas with each other to form the nitrogen-mixed air. Then, the nitrogen-mixed air feed passages 32 each are connected to the oven body 10, resulting in communicating with the interior of the oven body 10. Thus, the nitrogen-mixed air feed passages 32 each are adapted to guide the nitrogen-mixed air to the oven body 10. The nitrogen-mixed air feed passages 32 each are provided therein with a heater 34 which serves to heat the nitrogen-mixed air to a predetermined temperature, followed by feeding it to the oven body. Alternatively, one such heater 34 may be provided in a manner to be common to the passages 32. In the illustrated embodiment, the dehumidifying agent is arranged so as to act as the dehumidifying means 28. Alternatively, the dehumidifying means 28 may comprise a dehumidified air feed means which may be constructed so as to feed compressed air or ambient atmosphere therethrough. In a modification, the dehumidified air feed means may be constructed so as to feed air or ambient atmosphere through a filter. In another modification, it may be constructed so as to flow ambient atmosphere into hollow fibers.

The dehumidified air inlet section 22 is arranged so as to feed, into an area of the oven body 10 extending from the preheat sections 14 and 16 to the reflow section 18, the dehumidified air comprising the dehumidified nitrogen-mixed air or only the dehumidified ambient atmosphere. In the illustrated embodiment, the dehumidified air inlet section or dehumidified nitrogen-mixed gas inlet section 22 is arranged so as to concentratedly introduce the dehumidified nitrogen-mixed air into the oven body 10 at positions corresponding to positions at which flux contained in paste solder forms a protective film between preheating of the paste solder adhered to a surface of the printed board by means of the heaters 20 of the preheat sections 14 and 16 and melting of solder alloy contained in the paste solder. The dehumidified air preferably has a relative humidity as low as 20% or less. Also, the dehumidified nitrogen-mixed air preferably has an oxygen concentration of 10 to 100 ppm. In the illustrated embodiment, the dehumidified air inlet section 22 is arranged above the reflow section 18 so that the dehumidified nitrogen-mixed air is concentratedly fed to the reflow section in view of a temperature at which the paste solder is heated. Alternatively, the dehumidified air inlet section 22 may be arranged so as to concentratedly feed the dehumidified nitrogen-mixed air to an area of the oven body extending between last-stage one of the multiple preheat sections and the reflow section 18, depending on conditions under which the flux forms a protective film.

The preheat section 14, preheat section 16 and reflow section 18 are substantially separated or isolated from each other in turn by partitions 36 and 38, resulting in being in the form of chambers substantially isolated or independent from each other, while ensuring that the conveyor 12 travels through the partitions 36 and 38 in the oven body 10. Such arrangement of the sections or chambers 14, 16 and 18 permits not only an atmosphere in each of the chambers to be independently controlled as desired while being kept at a desired temperature by the heaters 20 therein but the dehumidified nitrogen-mixed air to be fed to each of the chambers through each of the ramified nitrogen-mixed air feed passages 32.

Now, the manner of operation of the reflow oven constructed as described above will be described hereinafter.

Figure 2:
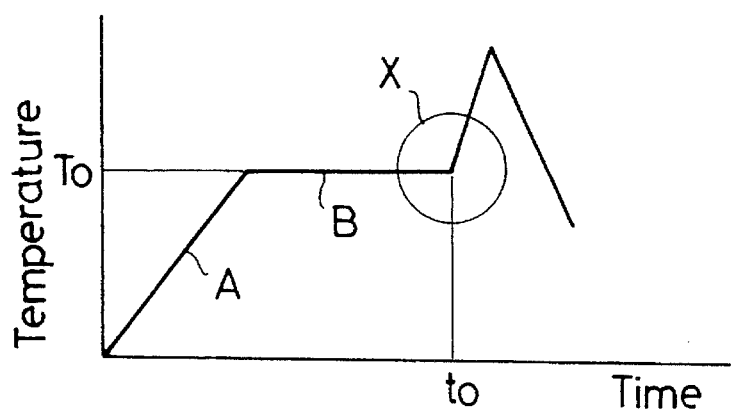
FIG. 2 is a graphical representation showing a relationship between an temperature and time in a soldering zone of the apparatus of FIG. 1.
Figure 3:
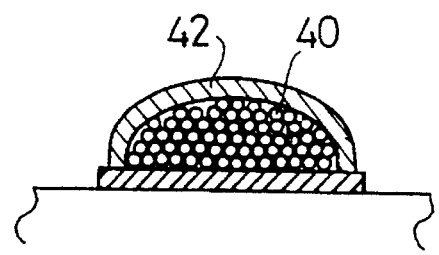
FIG. 3 is a schematic sectional view showing solder alloy on which a protective film is formed by flux in a heating treatment carried out in the apparatus of FIG. 1.

A printed board on which an electronic component is previously temporarily fixed is transferred to the oven body 10 while being carried on the conveyor 12. This results in the printed board being subjected to a heating treatment in the soldering zone extending from the first-stage preheat section 14 through the second-stage preheat section 16 to the reflow section 18. The heating treatment is carried out under such temperature profile conditions as shown in FIG. 2 because the sections 14, 16 and 18 are arranged in the form of chambers separated from each other by the partitions 36 and 38. FIG. 2 shows a temperature profile obtained when eutectic solder is used as the paste solder. Temperature profiles of the printed board obtained when it is positioned in the preheat section 14 and preheat section 16 shown in FIG. 1 are indicated at reference characters A and B in FIG. 2, respectively. In the illustrated embodiment, a temperature $T_O$ of the line B in the preheat section 16 is about 170° to 180° C. and a length of time $t_O$ extending from the start of A to the end of B is about 70 to 90 seconds. Also, a temperature profile of the printed board obtained in the reflow section 18 is in a range indicated by X and a range subsequent thereto in FIG. 2. Thus, during the heating treatment under such temperature profile conditions, the paste solder is first preheated to a temperature in the preheat sections 14 and 16, so that a flux ingredient contained in the paste solder starts to precipitate or separate out on a surface of solder alloy contained in the paste solder and/or a surface of each of lands of a conductive pattern of the printed board. Then, the heating treatment to which the printed board is subjected during transferring of the printed board to the reflow section 18 is carried out at a higher temperature, resulting in the solder alloy starting to melt. At the point X (FIG. 2) when the flux separates out or precipitates to form a protective film before the above-described melting of the solder alloy, the oven body 10 is concentratedly fed with the dehumidified oxygen-mixed air from the dehumidified air inlet section 22, resulting in a dehumidified atmosphere being formed in the oven body 10. Thus, the dehumidified atmosphere is formed by constantly feeding the dehumidified nitrogen-mixed air from the air inlet section 22 to the oven body 10. The dehumidified atmosphere may be kept by intermittently feeding the dehumidified nitrogen-mixed air to the oven body 10 at predetermined cycles.

The dehumidified atmosphere thus formed in the oven body 10 substantially prevents deterioration of activity of the flux due to absorption of moisture or water by the flux, so that the flux may form, on solder alloy 40, a protective film 42 exhibiting a satisfactory function or performance. The protective film 42 may be formed so as to cover a substantially whole surface of the solder alloy 40 right before starting of melting of the solder alloy. Formation of the protective film 42 in such a manner effectively prevents oxidation of the solder alloy due to the melting and permits the solder alloy melted to be cured while keeping wettability of the solder alloy. Also, the dehumidified nitrogen-mixed air contains nitrogen gas, so that the nitrogen gas substantially prevents an oxide film from being formed on the solder alloy and the lands of the conductive pattern.

Further, formation of the protective film 42 by the flux and melting and curing of the solder alloy 40 described above effectively prevent formation of solder balls and/or solder bridges due to evaporation of water or the like, as well as a failure in soldering due to formation of an oxide film on the solder alloy, to thereby provide satisfactory soldering. In order to avoid deterioration of activity of the flux due to absorption of moisture thereby and production of an oxide film on the solder alloy, contents of a rosin, a solvent, an activator and the like in the flux may be reduced. This also contributes to elimination of any cleaning operation after soldering.

As can be seen from the foregoing, the present invention effectively prevents deterioration of activity of flux of paste solder and formation of solder balls in an oven body even when it is constructed into a non-closed structure which allows flowing of an ambient atmosphere thereinto and substantially prevents an oxide film from being formed on solder alloy of the paste solder to ensure firm soldering of an electronic component on a printed board. Also, the present invention prevents an increase in cost of equipment.

A preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for soldering an electronic component comprising the steps of:

subjecting paste solder to a preheat treatment and a reflow treatment in turn with time in an oven constructed into a non-closed structure having an inlet section and an outlet section which allows flowing of an ambient atmosphere into the oven body, resulting in fixing the electronic component on a printed board by soldering using the paste solder; and introducing dehumidified air into said oven while an air balance in the oven is kept by allowing an ambient atmosphere to flow into and out of the oven body through the inlet and outlet sections to provide an interior of said oven with a dehumidified atmosphere.

2. A method as defined in claim 1, wherein said dehumidified air comprises nitrogen-mixed air formed by mixing a dehumidified ambient atmosphere and nitrogen gas with each other.

3. A method as defined in claim 2, wherein said preheat treatment and reflow treatment are carried out in chambers defined in said oven in a manner to be separated from each other, respectively.

4. A method as defined in claim 2, wherein said dehumidified air has a relative humidity as low as 20% or less.

5. A method as defined in claim 1, wherein said dehumidified air has a relative humidity as low as 20% or less.

6. A method as defined in claim 1, wherein said preheat treatment and reflow treatment are carried out in chambers defined in said oven in a manner to be separated from each other, respectively.

7. A method as defined in claim 4, further including the step of introducing the dehumidified air into one or more of said chambers.

8. A method as claimed in claim 7, wherein the dehumidified air is fed into the chambers intermittently.

9. A method as defined in claim 1, including the step of introducing the dehumidified air into said oven upon the precipitation of flux contained in the paste solder forming a protective film over the paste solder.

* * * * *

UNITED STATES PATENT AND TRADEMARK OFFICE
CERTIFICATE OF CORRECTION

PATENT NO. : 5,526,978
DATED : June 18, 1996
INVENTOR(S) : Nagatsuka et al.

It is certified that error appears in the above-identified patent and that said Letters Patent is hereby corrected as shown below:

On the title page: Item [56]

Attorney, Agent, or Firm, "Krumhutz" should read --Krumholz--.

Column 7, line 7, "claim 4" should read --claim 6--.

Signed and Sealed this

Twelfth Day of November, 1996

Attest:

BRUCE LEHMAN

*Attesting Officer*  *Commissioner of Patents and Trademarks*